Figure 1:
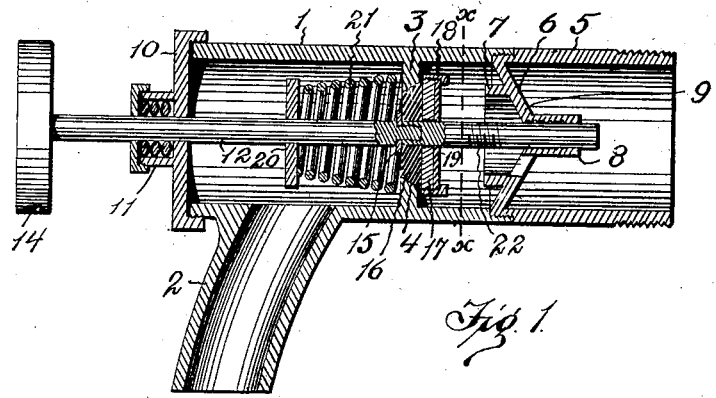

No. 865,506. PATENTED SEPT. 10, 1907.
L. C. LEWIS.
COCK.
APPLICATION FILED FEB. 27, 1906.

WITNESSES

INVENTOR
Lewis C. Lewis
BY
ATTORNEY

UNITED STATES PATENT OFFICE.

LEWIS C. LEWIS, OF COLUMBUS, OHIO, ASSIGNOR TO THE MONARCH MANUFACTURING COMPANY, OF COLUMBUS, OHIO, A CORPORATION OF OHIO.

COCK.

No. 865,506.  Specification of Letters Patent.  Patented Sept. 10, 1907.

Application filed February 27, 1906. Serial No. 303,166.

*To all whom it may concern:*

Be it known that I, LEWIS C. LEWIS, a citizen of the United States, residing at Columbus, in the county of Franklin and State of Ohio, have invented certain new and useful Improvements in Cocks, of which the following is a specification.

My invention relates to new and useful improvements in cocks and more particularly to a combined self closing and compression cock.

The object of the invention is to provide a superior cock of simple construction adapted to be used either as a self closing cock or as a compression cock.

Another feature resides in the construction whereby the cap and casing may be removed for inspection or repair without disconnecting the cock from the pipe, tank or other part with which it is engaged.

Finally the object of the invention is to provide a device of the character described that will be strong, durable and efficient, simple and comparatively inexpensive to make and one in which the several parts will not be likely to get out of working order.

Figure 2:
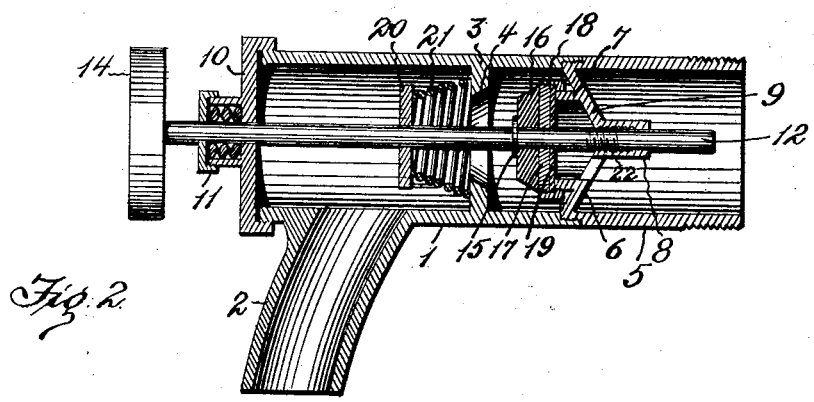
Figure 3:
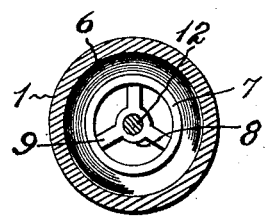

With the above and other objects in view, the invention consists of the novel details of construction and operation, a preferable embodiment of which is described in the specification and illustrated in the drawings, wherein:

Figure 1. is a longitudinal sectional view showing the valve closed when used as a self closing cock, Fig. 2. is a longitudinal sectional view showing the valve closed when used as a compression cock, and Fig. 3 is a transverse sectional view taken on the line X—X of Fig. 1.

In the drawings the numeral 1 designates a cylindrical casing which is formed at its forward end with a depending nose 2. A short distance from the inner or rear end the casing is provided with a transverse wall 3, the latter being formed with a conical valve seat 4. At its inner end the casing is reduced and screw threaded and receives a short sleeve 5. The sleeve 5 is formed at its point of connection with the casing with an inverted cone shaped support 6, from which a forwardly projecting ring 7 extends. This ring 7 forms the compression valve seat as will be hereinafter described. The only opening in the support is through the ring 7 and centrally within the ring and also centrally of the sleeve, a rearwardly extending bearing collar 8 is supported by a spider 9 formed integral with the support 6. A cap 10 is threaded on the outer end of the casing and carries a suitable stuffing box 11 through which a valve rod 12 extends. The valve rod projects some distance beyond the cap and has mounted on its outer end an operating disk 14. This valve rod extends inwardly passing through the valve seat 4 and the bearing collar 8 which forms its inner support. From this it will be apparent that the valve rod may be either reciprocated or turned by means of the disk 14. I prefer to make the valve rod in two pieces screwed together and carrying a washer 15 at their point of connection. A conical rubber disk valve 16 adapted to fit in the valve seat 4 is disposed about the valve rod against the washer. This disk is held in place by a flat metal disk 17 screwed onto the rod and having its periphery screw-threaded to receive a flanged collar 18, which engages about the outer edge of a rubber or fiber washer 19 and holds the same against the disk as clearly shown in Figs. 1 and 2. A double sided valve is thus provided, the disk adapted to fit in the valve seat 4 and the washer 19 arranged to engage the ring 7. For holding the disk 16 in its seat, I fix on the valve rod between the wall 3 and the cap 10, a metallic disk 20 adapted to receive the outer end of a coiled spring 21 encircling the valve rod and bearing against the wall 3. When it is desired to open the valve, the valve rod is forced inward carrying the disk 16 back and out of its seat and compressing the spring 21. Therefore when the pressure is relieved on the valve rod the spring extends closing the disk valve in the seat 4, thus providing a self closing cock.

When it is desired to use the device as a compression cock, the valve rod 12 is forced inward until its screw threaded portion 22 enters the collar 8, which is also screw threaded, then by turinng the valve rod it may be screwed into the collar and the disk 19 caused to bind on the edge of the ring 7, which forms a valve seat. As before stated the only escape for the fluid is through the ring 7 and by closing the disk thereon, a compression cock is had as shown in Fig. 2. With the parts in this position, the casing 1 and the cap 10 may be removed or the stuffing box repacked without disconnecting the cock from the part to which it is attached.

What I claim is:

In a cock of the character set forth, the combination with a casing which is made in two sections, of a pair of webs spanning said casing, one of said webs being carried by each of said sections, a valve stem mounted to slide and turn in said casing, a valve carried by said valve stem and located between said webs, each of said webs being perforated for the passage of water and forming valve seats, a member carried by the valve stem, a spring bearing between said member and one of said webs to force said valve stem in one direction and to bring said valve into engagement with the valve seat of one of the webs, and screw threads carried by the valve stem and the other of said webs which are adapted when engaged with each other to draw said valve into engagement with the valve seat of the last named web, said spring normally holding said threads out of engagement with each other.

In testimony whereof I affix my signature in presence of two witnesses.

LEWIS C. LEWIS.

Witnesses:
C. M. KLING,
M. B. SCHLEY.